(12) United States Patent
Faires

(10) Patent No.: US 7,558,009 B1
(45) Date of Patent: Jul. 7, 2009

(54) MAGNA EYE

(76) Inventor: Jack Faires, 7830 Bradburn Blvd., Westminster, CO (US) 80030

( * ) Notice: Subject to any disclaimer, the term of this patent is extended or adjusted under 35 U.S.C. 154(b) by 0 days.

(21) Appl. No.: 11/505,275

(22) Filed: Dec. 20, 2007

(51) Int. Cl.
*G02B 27/02* (2006.01)

(52) U.S. Cl. ....................................................... 359/802
(58) Field of Classification Search .................. 359/802
See application file for complete search history.

(56) References Cited

U.S. PATENT DOCUMENTS

| | | | |
|---|---|---|---|
| D246,047 S * | 10/1977 | Zalman | D16/135 |
| 4,685,647 A * | 8/1987 | Calhoun | 248/444.1 |
| 5,267,716 A * | 12/1993 | Friedman | 248/291.1 |
| 6,199,816 B1 * | 3/2001 | Case | 248/460 |
| 6,417,894 B1 * | 7/2002 | Goff et al. | 348/832 |
| 6,574,051 B1 * | 6/2003 | Powell | 359/802 |
| 2002/0051304 A1 * | 5/2002 | Jung | 359/802 |

* cited by examiner

*Primary Examiner*—Jordan M. Schwartz
*Assistant Examiner*—James C Jones

(57) ABSTRACT

A magnifier for greatly assisting in enlarging print to make it readable to a viewer. The magnifier having a base comprising welded aluminum. The magnifier housing being adjustable to provide the lens and reading material to be properly aligned for viewing.

3 Claims, 7 Drawing Sheets

MAGNA EYE

SUMMARY OF THE INVENTION

A magnifier for greatly assisting in enlarging print to make it readable to a viewer. The magnifier having a base comprising welded aluminum. The magnifier housing being adjustable to provide the lens and reading material to be properly aligned for viewing.

DETAILED DESCRIPTION OF THE INVENTION

Figure 1:
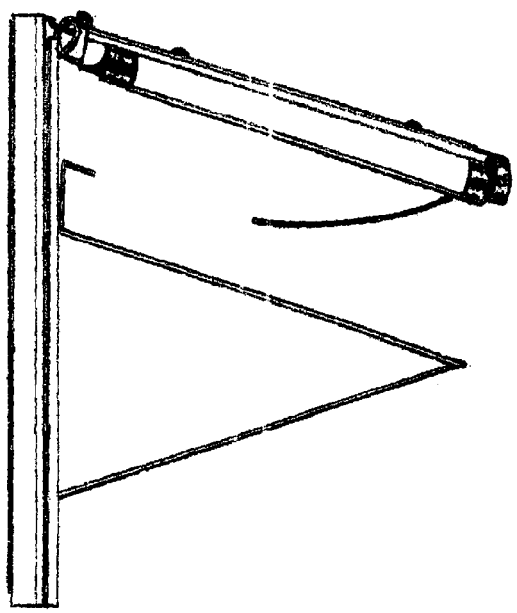
FIG. 1 is a side view of the Big Eye Viewer.
Figure 2:
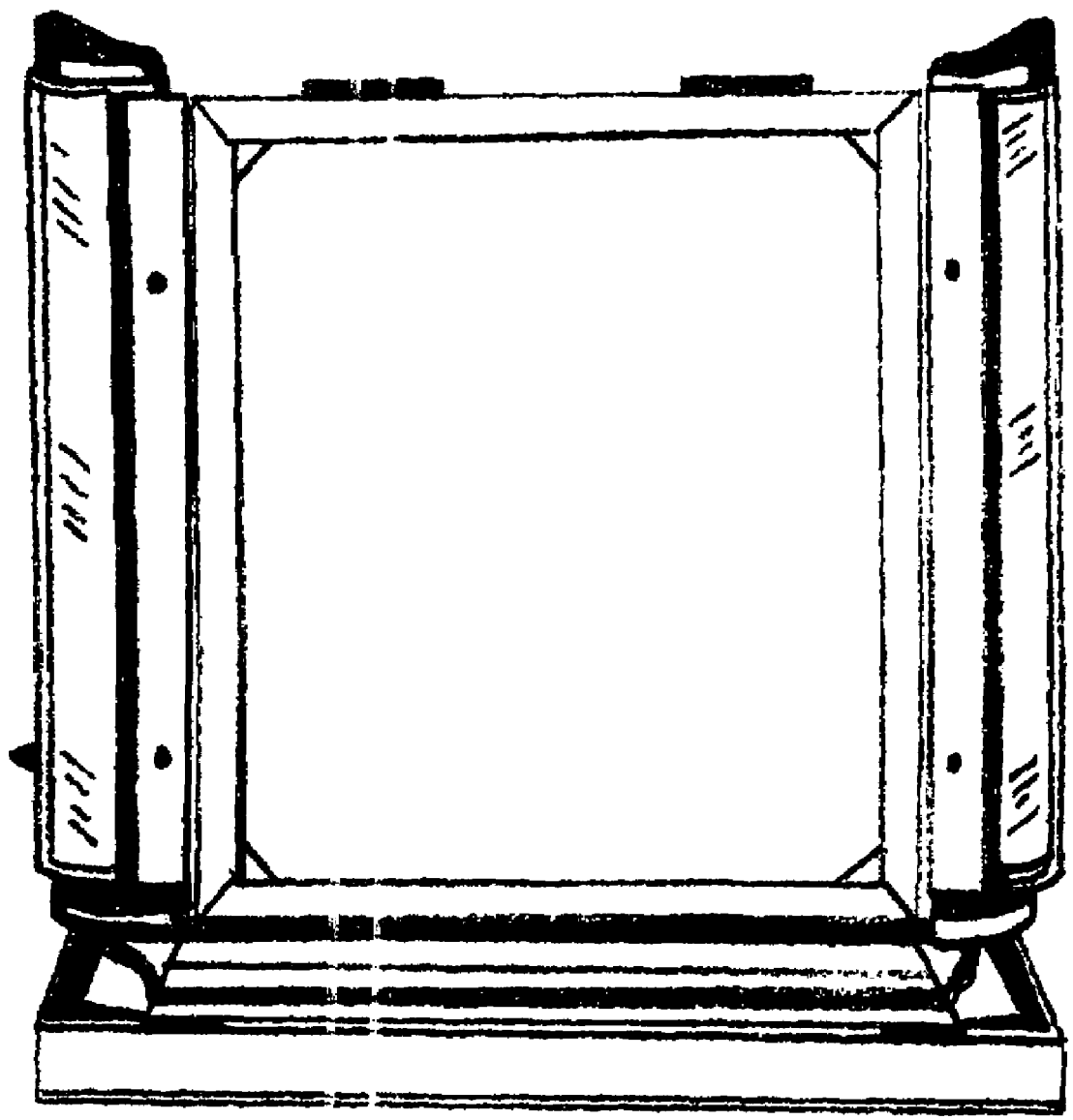
FIG. 2 is a front view of the Big Eye Viewer.
Figure 3:
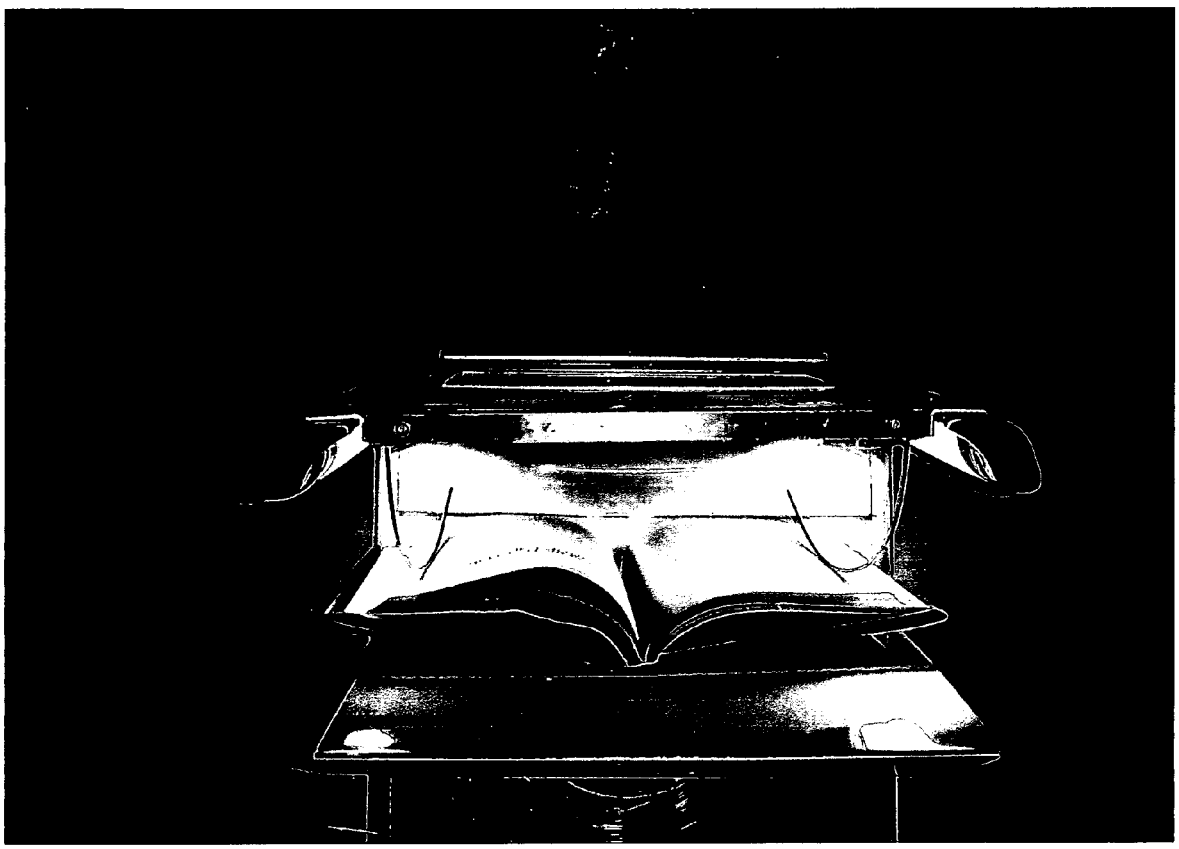
FIGS. 3-7 are various views of the Big Eye Viewer.
Figure 4:
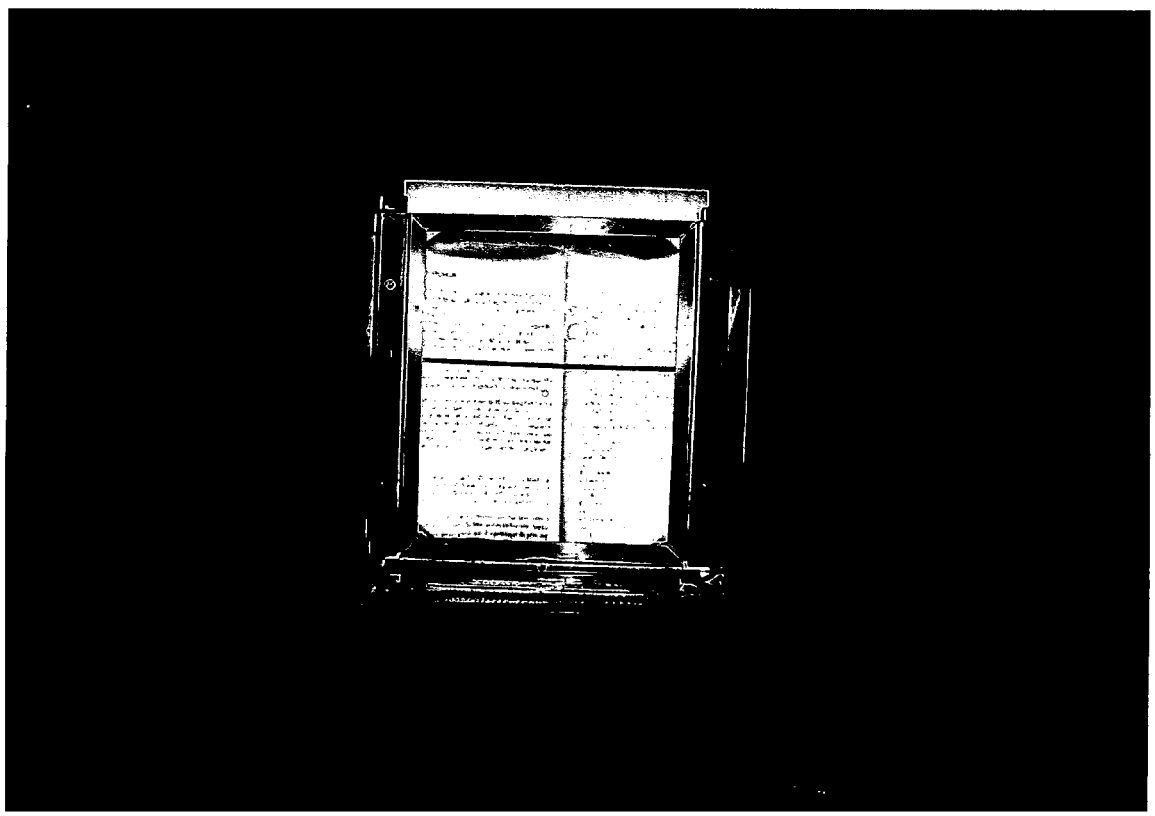
Figure 5:
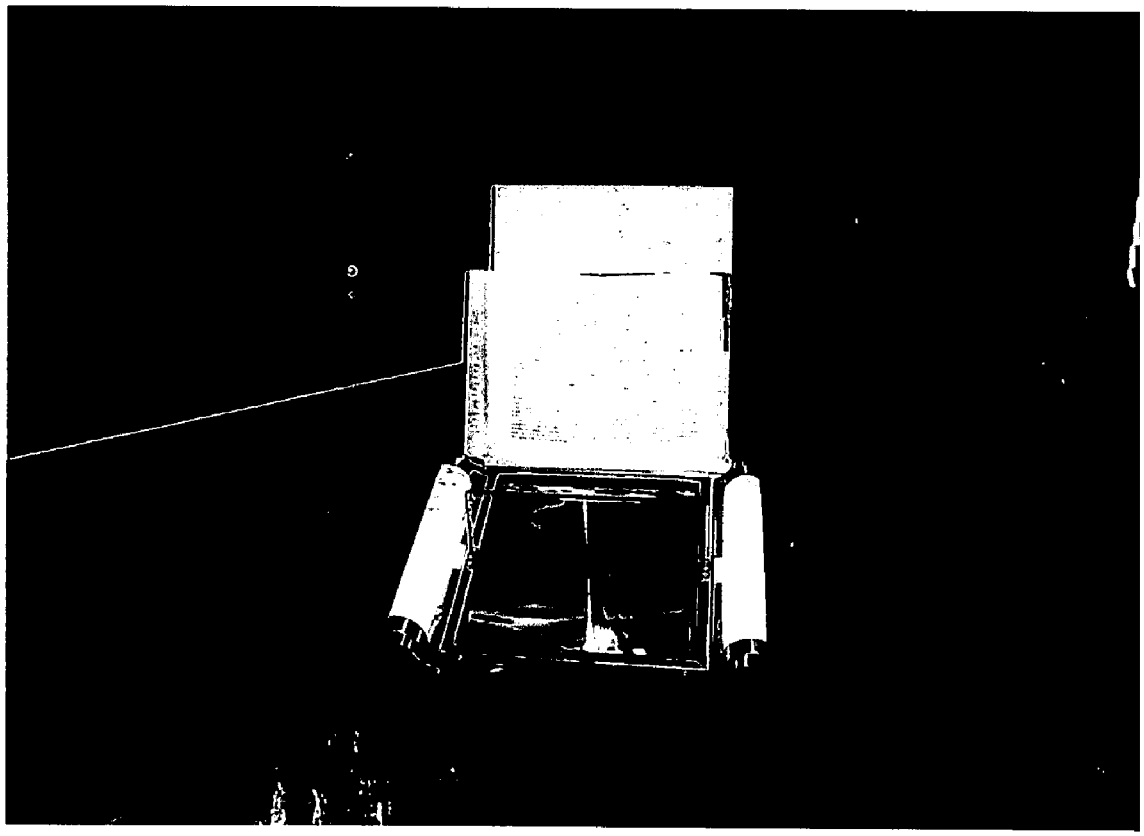
Figure 6:
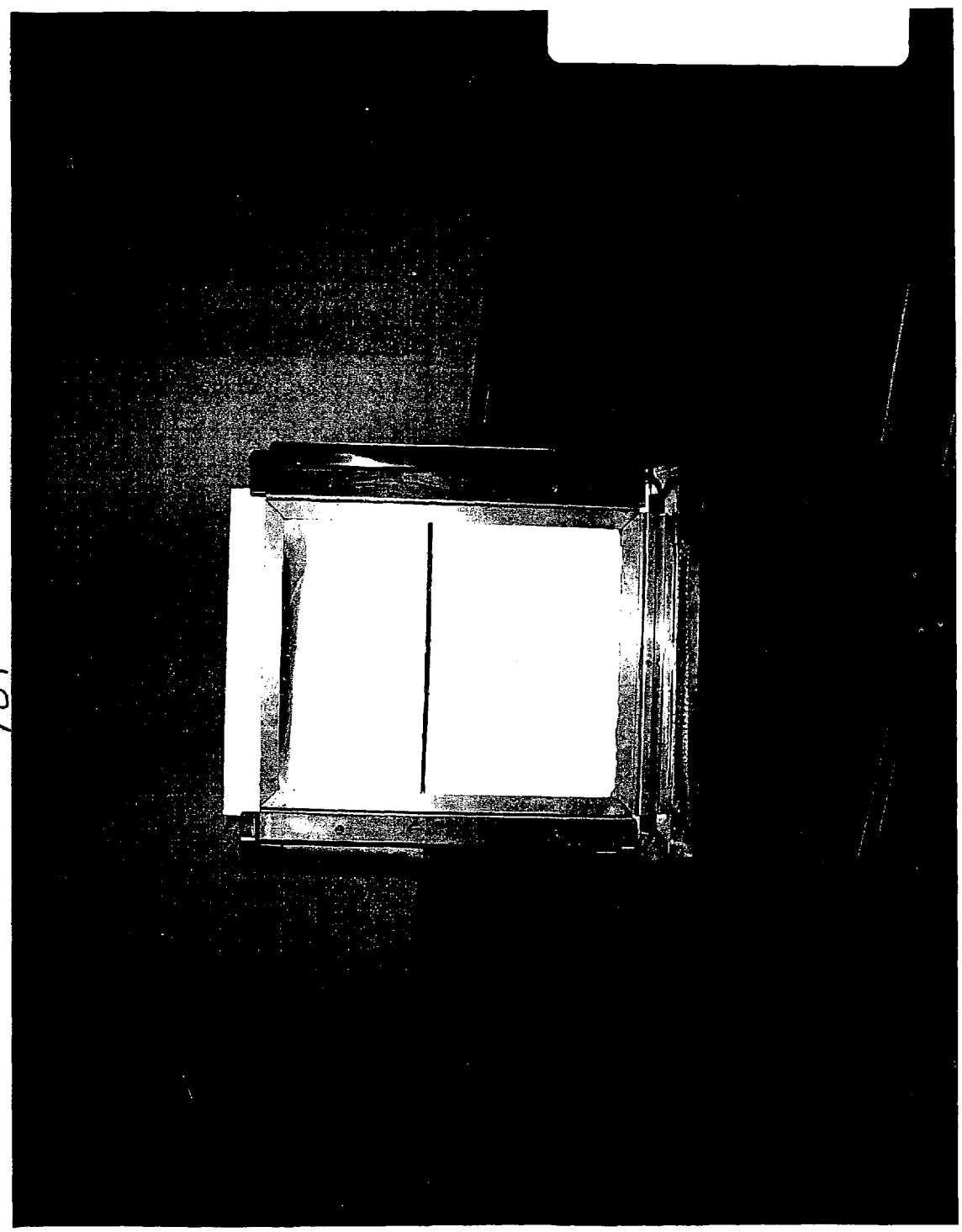
Figure 7:
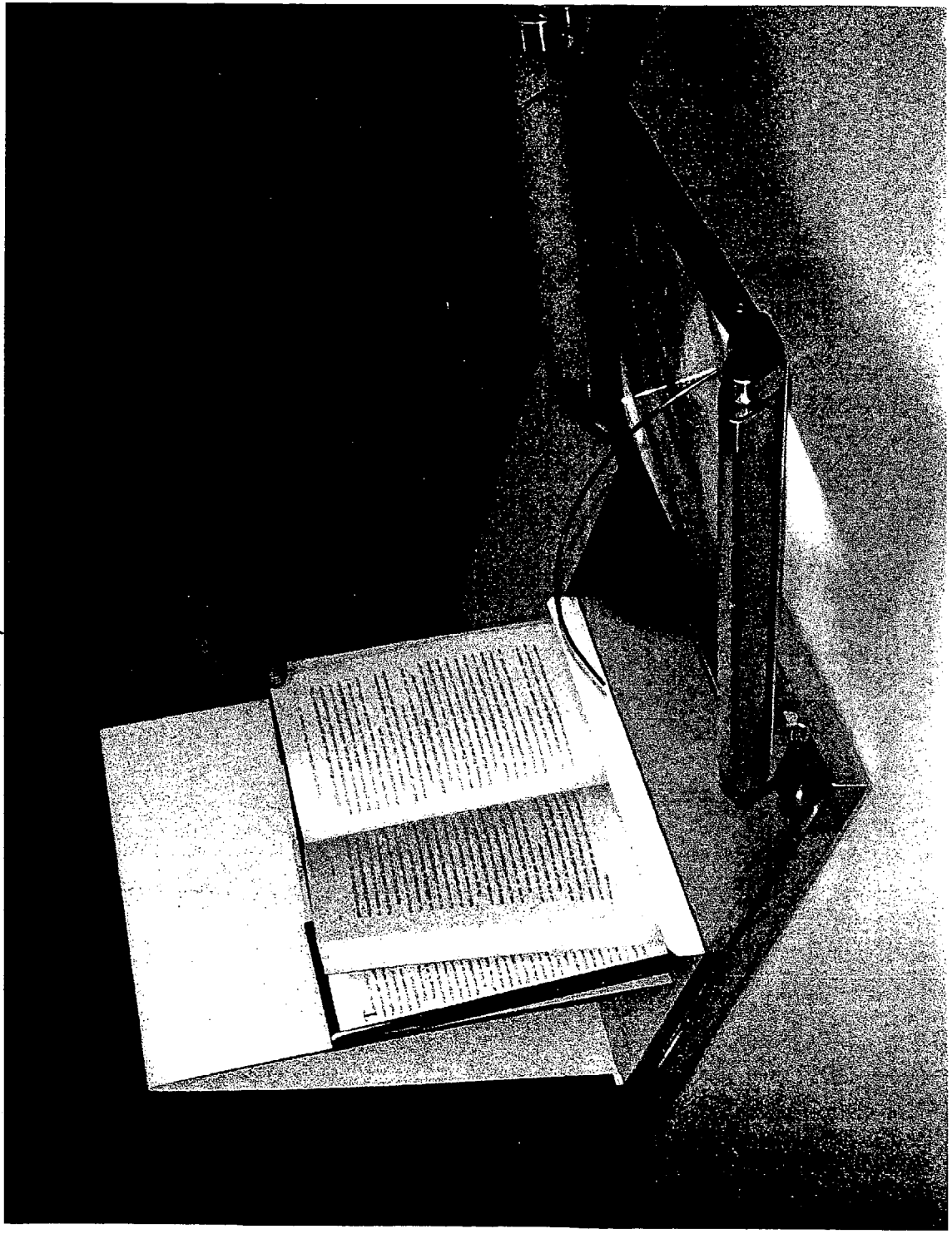

The Big Eye is the name, plus function of this patented device. It has an adjustable framed 9"×11" resin type plastic machined to give a magnifying image in the range of 4 to 6 power of magnification. The base frame is fabricated of square 1 inch 18 gage TIG welded, to form a solid 14"×16" base with a 22 gage aluminum floor. The sides have a ½" folded grooved to 180 degrees to form slides to hold the back of the book or paper rest at the slant backward of 10 degrees. The base void underneath the floor houses the ballast for the lights and power cords, On the front, facing the viewer, is the lens housing constructed of ½"×½" aluminum channel with a rubber grommet, which holds the magnifier lens in place within channel. The corners are TIG welded for strong and secure framing. This in turn becomes an integral part of the bottom of the lens frame, but also the tubular part of the hinge. Attached to the top of the lens frame is a ⅛" spring steel bent wire, with a welded cross wire that holds the reading material open and in place against the book or material in place for ease of reading. I have selected four colors that will be applied after a polished surface to form a durable, long lasting seal and finish. This adds to the attractiveness of The Big Eye. I will strive to improve on the appearance and working parts. I have incorporated two 12-watt florescence lights. The Sidelights on the sides giving very ample light. I also will offer four different powder-coated colors such as white, tan, blue and red. The lens frame that is hinged at the bottom readily hinges forward to the horizontal position, this lets the viewer easily change pages or reading material. Incapacitated and older people will enjoy The Big Eye, I am quite sure. For the elderly with limited income it becomes affordable. This style of viewer is also very useful for our permanently injured Military Service individuals who were injured while on active duty for our country. In describing I have explained how each item of The Big Eye works and its function, where it is located, its duties and how it works.

What is claimed is:

1. A magnifier comprising:
a base; a housing; a reading material holder;
the base having a square like shape comprising welded aluminum; the housing holding a resin lens within surrounding walls of the housing; the reading material holder is located on the top surface of the base and holds material to be read at a 10 degree angle from vertical; the housing being adjustable to provide the lens and reading material to be properly aligned for viewing; the housing further comprising a steel bent wire with a welded cross wire that holds the reading material in place; the resin lens providing in the range of 4 to 6 powers of magnification.

2. The magnifier of claim 1, wherein the lens is housed in an aluminum channel with a rubber grommet that holds the lens in place.

3. The magnifier of claim 1, the lens frame being hinged at the bottom to allow the lens to be moved to a horizontal position, thus allowing a viewer to easily change pages of the reading material.

* * * * *